United States Patent [19]
Pielkenrood

[11] 3,837,501
[45] Sept. 24, 1974

[54] SEPARATION DEVICE

[75] Inventor: Jacob Pielkenrood, Krommenie, Netherlands

[73] Assignee: Pielkenrood-Vinitex N.V., Krommenie, Netherlands

[22] Filed: Feb. 4, 1971

[21] Appl. No.: 112,620

[30] Foreign Application Priority Data
Feb. 6, 1970 Netherlands.................. 7001713
Mar. 27, 1970 Netherlands.................. 7004494

[52] U.S. Cl. ............................................ 210/522
[51] Int. Cl. ........................................... B01d 21/10
[58] Field of Search................... 210/519, 521, 522

[56] References Cited
UNITED STATES PATENTS

| | | | |
|---|---|---|---|
| 2,673,451 | 3/1954 | Gariel | 210/521 X |
| 2,868,384 | 1/1959 | Puddington | 210/521 |
| 3,491,892 | 1/1970 | McCann | 210/521 |
| 3,552,554 | 1/1971 | Olgard | 210/521 |
| 3,563,389 | 2/1971 | Mizrahi | 210/521 |

FOREIGN PATENTS OR APPLICATIONS

| | | | |
|---|---|---|---|
| 907 | 1/1886 | Great Britain | 210/521 |
| 1,098,155 | 7/1955 | France | 210/521 |
| 17,980 | 6/1897 | Great Britain | 210/521 |

*Primary Examiner*—Charles N. Hart
*Assistant Examiner*—F. F. Calvetti

[57] ABSTRACT

A device for separating components from a carrier liquid, comprising mutually parallel corrugated plates, troughs or similarly shaped surfaces, delimiting therebetween separation passages, the longitudinal axes of which corrugations or the like which determine the direction of removal of the separated components include an angle with the direction of the supply and discharge flow of the liquid, in order to obtain an optimal separation between the liquid flow and the flow of the separated components to be removed from the device.

16 Claims, 17 Drawing Figures

PATENTED SEP 24 1974

INVENTOR
JACOB PIELKENROD
BY
*Bayard Michael*
ATTORNEY

PATENTED SEP 24 1974 3,837,501

INVENTOR
JACOB PIELKENROD
BY
Bayard Michael
ATTORNEY

INVENTOR
JACOB PIELKENROD
BY
Bayard Michael
ATTORNEY

SEPARATION DEVICE

BACKGROUND OF THE INVENTION

The invention relates to a device for separating components precipitating or floating from a carrier liquid, which device comprises a number of substantially mutually parallel bordering means for separation passages or groups thereof, one side of these passages communicating with a supply duct for the liquid to be treated, and the opposite side communicating with a discharge duct for the treated liquid, at least one extremity of the passages opening into a collecting duct for the separated components, which bordering means have an inclination promoting the discharge of these components along the bordering means towards the collecting duct in question.

Devices of this kind are known, in which the bordering means are constituted by a set of substantially parallel inclined corrugated plates or troughs, the planes through the longitudinal axes of the corrugations and perpendicular to the main direction of the corrugated plates or troughs being substantially vertically directed. The liquid to be treated is supplied at the lower or higher extremity of the assembly of passages, the components which are heavier than the carrier liquid precipitating in the valleys of the corrugations and sinking in these valleys towards the lower extremity, and the components which are lighter than the carrier liquid collecting in the tops of the corrugations and floating towards the higher extremity.

Although it is possible to operate with parallel currents, this has the disadvantage that at the exit side of the purified liquid also the discharge of the separated components takes place, so that, there, two layers with extreme concentration differences are contacting each other, which may easily lead to remixing. Therefore, at least as far as the most important component to be separated is concerned, a counter-current operation is preferred, so that the discharge of this component takes place at the supply side of the liquid to be treated. The consequence thereof is, however, that the liquid flow, when separating precipitating components, should be directed upwards, and, when separating floating components, downwards.

The known devices operate satisfactorily as such, and are capable of a good separation. Nevertheless in some cases improvements are desired, which are not possible with the known devices.

When discharging the separated components at the extremity in question, it is to be prevented that remixing is caused by turbulences in the liquid flow. In order to prevent such turbulences, discharge ducts delimited by guiding partitions may be used, which may provide a separation between the supply and discharge flows, so that the liquid flow, in the case of precipitating components, is directed towards the tops of the corrugations, and in the case of flotating components towards the valleys thereof, and the separated components are removed from the valleys or tops respectively. The consequence thereof is, however, that the available flow cross-section is reduced to half the total cross-section. In order to increase the yield, several separators should be arranged in parallel.

The separation effect of such a device is, furthermore, subject to limitations, since, when the separated component has completely filled the corrugation portion in question near the discharge extremity or the discharge ducts, a further increase of the separation is no longer possible, and, particularly in the case of precipitating components, obstruction will occur in the long run, necessitating frequent cleaning. As far as such a discharge saturation has not yet occurred, an improvement of the separation may be obtained by extending the passages in the flow direction, but this requires a corresponding increase of the depth of the basin in which the assembly is arranged, which depth, however, is usually subject to restrictions. An improvement of the separation may therefore, be obtained only by arranging several devices of this kind in series, which, however, requires the use of additional flow guides making the whole more complicated, and increasing the dimensions of the basin needed therefor more than would be actually required for accommodating the additional separation devices.

As was remarked before, the counter-current operation which is preferably applied requires a definite flow direction which, however, does not always match the given flow system, so that, then, substantial changes of the flow direction, often needing the use of pumps, are required.

Finally in such separators the coarser components will be separated first. Since, however, the discharge takes place in the flow direction and particularly in the opposite sense, the finer components which are separated later will be added to the coarser ones in the discharge, so that a fine classification of the separated components is not possible.

SUMMARY OF THE INVENTION

The invention has the object to provide a separation device, enabling a further improvement of the operation and the removal of the still existing objections.

To that end the device according to the invention is characterized in that, when the main planes of the bordering means include an angle $\alpha$ with the horizontal plane with $0 < \alpha \leq 90°$, the supply and discharge ducts are positioned in such a manner in respect of the passages that the angle $\gamma$ which the supply flow includes with the intersecting lines between the said main planes and the horizontal plane satisfies the relation $0 \leq \gamma \leq 90°$, and has, then, such a value that this flow is directed at a substantial angle in respect of the direction of the separated components flowing off along the bordering means. Preferably these bordering means possess profiles such as corrugations or ridges, the longitudinal axes of which having substantially the same direction, at least one extremity of these profiles communicating with the collecting duct, the longitudinal axes of these profiles including with the intersecting line of the main plane of the bordering means in question and the horizontal plane an angle $\beta$ satisfying the relation $0 < \beta \leq 90°$, and $\beta$ differing from $\gamma$.

DESCRIPTION OF THE PREFERRED EMBODIMENTS

Figure 1:
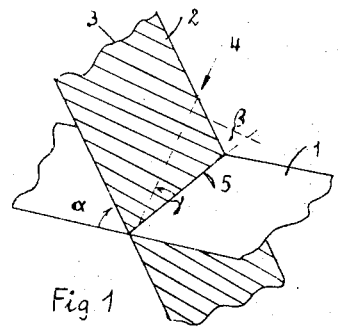
FIG. 1 a diagrammatical representation for elucidating the relationship between the various directions in a device according to the invention.

The simplified representation of FIG. 1 shows various variables which may play a part in designing separation devices. The horizontal plane is indicated at 1, and a plate 2 forming a delimitation of a separation passage is positioned at an angle $\alpha$ in respect of this plane. This plate is provided with profiles, of which only the longitudinal axes 3 are indicated. The direction of the supplied liquid flow is indicated at 4, and includes an angle $\alpha$ with the intersection line 5 of the planes 1 and 3. In the known separators with corrugated plates the angle $\alpha$ satisfies the relationship $0 < \alpha < 90°$, and the angles $\beta$ and $\gamma$ are then substantially equal to $90°$. According to the invention, however, these angles are varied in such a manner that a favorable adaptation to various flow conditions becomes possible, and, moreover, the removal of the separated components is simplified.

In the following reference will always be made to plates 2 with corrugations 3. In some cases, however, it is also possible to use plane plates, and the corrugations may also be substituted for by other profiles as will be explained below. In all the embodiments to be described the relationship $0 < \alpha \leq 90°$ is satisfied.

Figure 2:
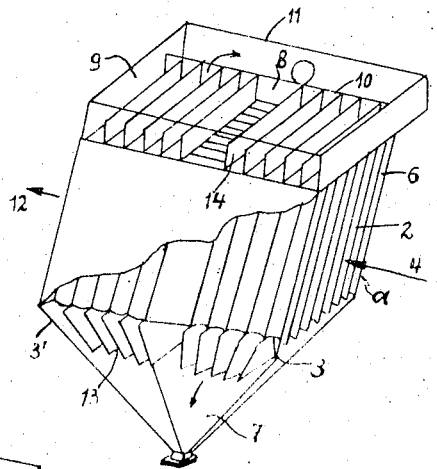
FIGS. 2–5 diagrammatical isometric views of different embodiments of a device according to the invention with parts broken away.

FIG. 2 show a first embodiment of the device according to the invention, in which $\beta = 90°$ and $\gamma = 0$. For the sake of clarity the enveloping walls are omitted for the greater part, and are only indicated by border lines. The mutually parallel plates 2 delimit separation passages 6. Vertical planes through the axes of the corrugations 3 are perpendicular to the main planes of the corrugated plates. The liquid flow 4 to be treated is introduced into the passages 6 substantially horizontally from a supply chamber not shown. The precipitating components may gradually settle, and slide downward along the corrugations 3, being collected in a collecting funnel 7 and being discharged from the lower end thereof. The separation effect will be better as the length of the liquid path in the passages is longer. When one of the corrugations 3 is completely filled with sediment at the lower end, its task may be taken over by a subsequent corrugation. When the danger exists that the first corrugations become completely filled or obstructed at their lower side, it is advisable to make the number of corrugations in the flow direction sufficiently large for obtaining a complete separation also at the lower side of the passages 6.

The corrugations 3 are directed with their bottoms downward for removing precipitating components. If floating components are to be separated, the bottoms of the corrugations are directed upward as shown at 3' at the left in FIG. 2. FIG. 2 shows a special arrangement, in which the flow passes at first a set of corrugations 3 serving to remove precipitating components, and subsequently the flow passes corrugations 3' intended for removing floating components.

Between both sets of corrugations a space 8 is present, where the plates 2 are interrupted or are smooth. In this part it is possible to introduce a flocculation agent and/or air, promoting the separation of floating components, the latter then being separated at the corrugations 3'. These components will then float on the liquid in a tank 9 above the assembly 2 communicating by means of an overflow partition 10, which is preferably adjustable, with a discharge duct 11, from which the floating components may be removed. The purified liquid leaves at 12 the plate assembly 2, and is removed from a discharge chamber not shown. It will be clear that with a different sequence of the corrugations 3 and 3' the space 8 may be used for introducing a sedimentation agent.

In order to prevent that at the upper and lower sides of the passages 6 the liquid will follow a path of less resistance through the funnel 7 or the flotation chamber 9 respectively, transverse partitions 13 and 14 respectively are provided therein, which are directed substantially transversely to the direction of the liquid flow and substantially parallel to the discharge direction of the separated components in question. These partitions do not impede the discharge of the separated components. The partitions 14 preferably extend above the liquid surface in the tank 9, and the partitions 13 should have such a length that the flow resistance for possible shunt flows is sufficiently large for completely suppressing these flows. These partitions may, in particular, serve as supporting and distance parts for the plates 2. Moreover the interspaces between these transverse partitions may be directed towards mutually separated discharge chambers, when a classification of the separated components is desired.

The embodiments according to FIG. 2 may be modified by directing the corrugations 3 at a smaller angle $\beta$, and moreover, the corrugations of successive plates may be arranged mutually offset. In the latter case the partitions 13 and 14 will be obliquely directed too.

As mentioned before, the flow path in such a separator may be made as long as is necessary for obtaining a good separation effect. Since the flow is directed horizontally, such an increase in length does not influence the depth of the basin in which the assembly is positioned. Furthermore it is possible to change the shape and dimensions of the corrugations and, if necessary, also the mutual distance between the plates 2, in the direction of flow, in order to obtain an optimal separation of the components which are difficult to separate. It will be clear that in the embodiment of FIG. 2 the collecting funnel 7 or the flotation tank 9 may be omitted, if no sedimentation or flotation will take place respectively.

Figure 3:
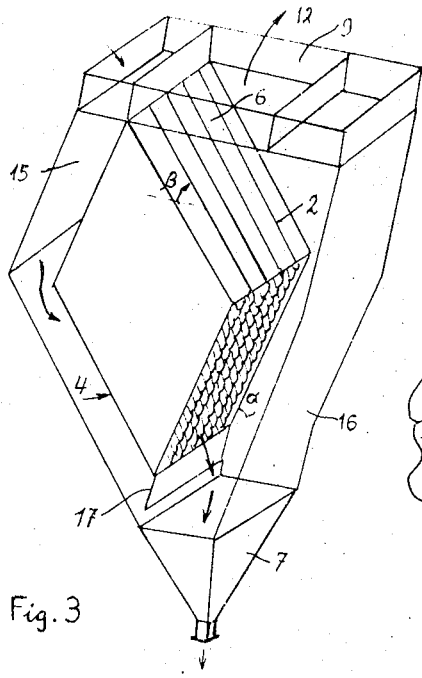

FIG. 3 shows another embodiment in which $\beta$ is an acute angle, and $\gamma$ is about $90°$. The liquid to be treated is supplied from a supply chamber 15 which is separated from the corrugated plate assembly 2, and the liquid will enter the passages 6 between these plates at the lower side, and may rise, subsequently, between the plates 2. The corrugations 3 of the plates 2 are obliquely directed and open laterally in a collecting chamber 16 which joins at its lower side a discharge funnel 7. The lower side of the supply chamber 15 communicates as well with this funnel 7, a guiding partition 17 counteracting undesired turbulences. In this manner the components precipitating in the supply chamber 15 may be removed. The embodiment shown in FIG. 3 is intended for precipitating components, but may, as will be obvious, also be made suitable for flotating components.

The embodiment according to FIG. 4 substantially corresponds with FIG. 2, but differs therefrom in that the extremities of the corrugations 3 do not communicate with collecting chambers lying below or above the plate assembly 2, but in such chambers which are positioned laterally thereof, as is also the case in FIG. 3. This embodiment shows some similarity with the usual plate separators with corrugated plates, but differs therefrom in that the liquid flow is directed transversely to the direction of the corrugations, so that the discharge of the separated components may be kept separated completely from the supply and discharge flows.

Figure 4:
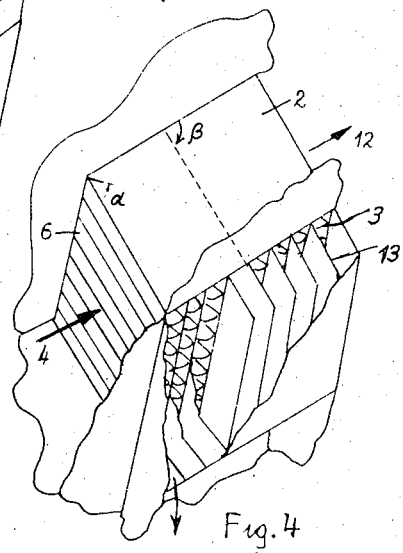
Figure 5:
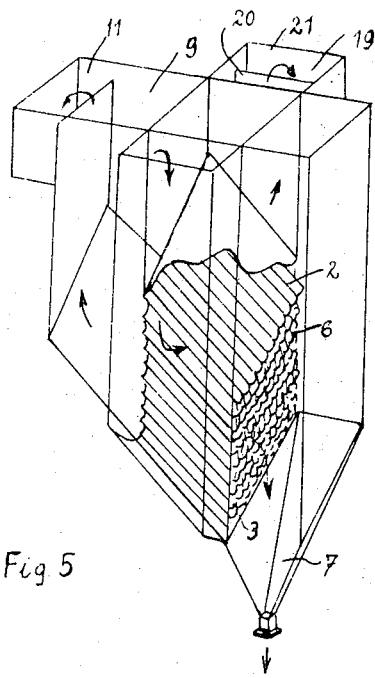

FIG. 5 shows still another embodiment in which the angles α, β and γ may be chosen arbitrarily. In the example shown, the angles β and γ are about 45° so that the liquid flow is directed substantially perpendicularly to the axis of the profiles, but these angles may also have other values. In the device according to FIG. 5, the substantially lozenge shaped plates 2 are positioned substantially vertically above each other. The liquid is supplied to a supply chamber 18 and leaves, after treatment, the device by a discharge chamber 19 which is, at the upper side, provided with an adjustable overflow weir 20 opening into a discharge trough 21. The components precipitating in the passages 6 are collected in a collecting funnel 7 and are subsequently removed, the flotating components arriving in a flotation chamber 9 communicating by means of an adjustable overflow weir 10 with a discharge trough 11. From the drawing it clearly appears that as a consequence of the crossed flow directions of the liquid and the separated components a complete separation between the different chambers is possible, which chambers surround the plate assembly 2 at all sides. If necessary also in this case auxiliary partitions may be used corresponding with the partitions 13 and 14 of FIGS. 2 and 4.

What has been remarked in respect of the plates and passages in the device according to FIG. 2, is mainly pertinent too for the devices of FIGS. 3, 4 and 5.

Figure 6:
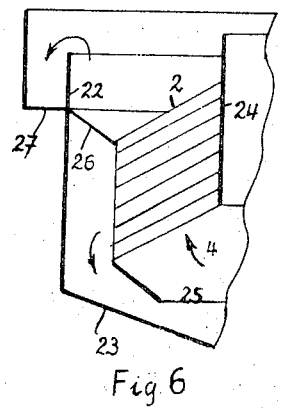
FIG. 6 a simplified cross-section of still another embodiment of a device according to the invention.

FIG. 6 shows the major parts of a separation device which differs from the device of FIG. 5 in that the substantially lozenge shaped plates 2 are not arranged above but behind each other. This device shows also much similarity with the device of FIG. 3. The embodiment of FIG. 6 is particularly suitable for being arranged into an existing sedimentation basin in which a more or less obliquely upward flow 4 is directed towards an overflow border 22. The precipitating substances which are still present in the flow are separated in the passages between the plates 2, and are returned toward the bottom 23 of the sedimentation basin by the corrugations 3. In order to maintain the flow in the desired direction, auxiliary partitions 24, 25 and 26 are provided. Sedimentation basins of this kind often have a conical bottom 23 and a circular border 22. Along the bottom 23 the sediment slides toward the center where also the liquid to be purified is supplied, and the substantially purified liquid flows somewhat obliquely upwards towards the border 22 of the basin and arrives over this border in a discharge trough 27. The plate assembly 2 may, then, in view of the relatively large diameter of such a basin, easily be arranged along a circle. When the direction of the corrugations is changed, such an arrangement may also be used for a mainly downwardly directed liquid flow or for separating flotating components. The embodiment of FIG. 6 mainly corresponds with that of FIG. 3 if the latter is given rotational symmetry.

The advantage of the invention is that several devices, particularly according to FIGS. 2–4, may be arranged as such in an existing sedimentation basin, so that efficiency of existing separation devices may be considerably improved in a simple manner. Besides extension in the sense of rotational symmetry, e.g. according to FIG. 3, it is also possible to construct compound devices with mirror symmetry. From the principle of the invention shown schematically in FIG. 1 it follows that an adaptation to existing conditions is possible in a large scale.

Figure 7:
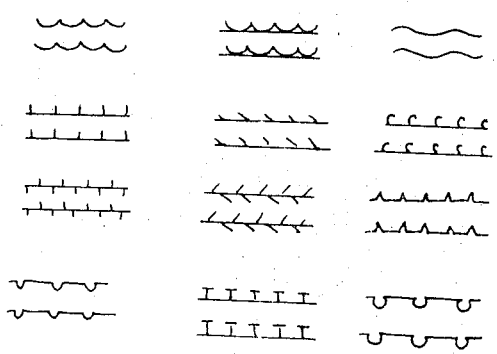
FIG. 7 diagrammatical views of various forms of profiles of passages bordering means in such devices.

FIG. 7 shows a number of diagrammatical views of possible profiles of the bordering means of the flow passages. It is remarked that these views are only intended as examples, and that many modifications may be made therein.

Figure 8:
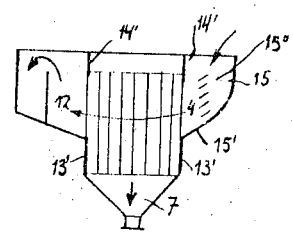
FIG. 8 a cross-section of a modification of the embodiment of FIG. 2.

FIG. 8 shows a modification of the embodiment of FIG. 2. The transverse partitions 13 and 14, serving to prevent short-circuiting of the plate assembly 2 through the collecting funnel 7 and/or the upper tank 9, may, in this case, be omitted. Instead thereof masking plates 13' and 14' are provided, covering the lower and upper parts respectively of the passages 6 at the supply side 4 and the discharge side 12. Moreover the supply chamber 15 has a sloping or curved bottom wall 15' which is directed towards the upper edge of the adjacent plate 13'.

The plates 13' and 14' have such dimensions that the flow resistance for the liquid flow directly from the remaining aperture at the supply side towards the remaining aperture at the discharge side is substantially lower than the flow resistance of the flow path through the funnel 7 and/or the upper tank 9.

The dimensions and vertical positions of the remaining apertures between the plates 13' and 14' at either side are not necessarily equal, so that it is possible to obtain a generally upward or downward main flow direction and/or an accelerated or decelerated flow, depending on the prevalent flow conditions and the character of the components to be separated.

Sediment precipitating in the supply chamber 15 will gradually flow downwards along the sloping or curved bottom wall 15' and towards the collecting funnel 7. For obtaining a uniform flow distribution at the supply side, it may be favorable to provide a slotted or louvered baffle 15'' in the supply chamber.

It will be clear that the additional plates 13' and 14' may also be used in the case of the other embodiments described above.

Figures 9, 10:
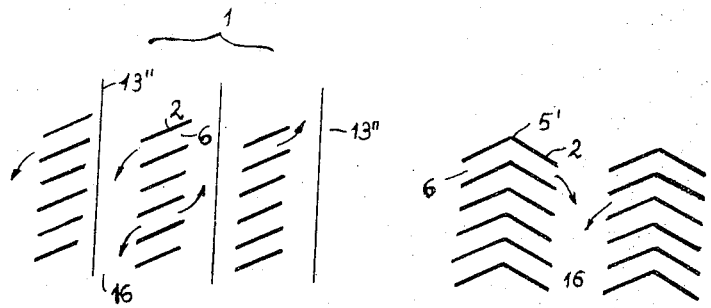
FIGS. 9 and 10 highly simplified diagrammatical front views of another separation assembly according to the invention.

FIGS. 9 and 10 show simplified views of two different separation assemblies which are based on the same principle as the preceding embodiments. These assemblies consist of mutually parallel sloping plates 2 which are divided into groups of superposed plates. Between the parallel plates passages 6 are present into which a liquid flow to be treated may be directed.

The following description will be based on a device which is mainly designed for separating precipitating components. Devices for separating floating components, in principle, have the same structure, but only some inclination angles should be modified.

The device according to the invention differs from that according to the main application in that the plates 2 are united into groups of superposed plates, and between each group a collecting duct 16 is present. The liquid flow to be treated is introduced into the passages 6 substantially parallel to the longitudinal axis of the plates, and the components separated therefrom move along these plates towards the adjacent ducts 16, as indicated by arrows in FIGS. 9 and 10.

In the case of FIG. 9 all the plates 2 of all the groups are mutually parallel, and in the case of FIG. 10 the plates are arranged in pairs with a contacting longitudinal edge, but instead of the latter arrangement corresponding plates bent into V-shape may be used. The crest 5' between such plates is, in a device for separating precipitating components, directed upwards, and is generally extending in a horizontal direction, although it may be favorable sometimes to position it at a certain slope. For separating floating components this crest is directed downwards.

Figure 11:
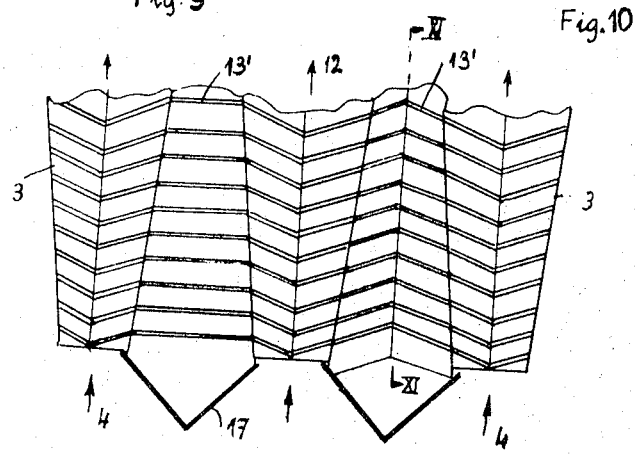
FIG. 11 a top view of such an assembly with two different embodiments of its guiding partitions.

Preferably the plates 2 are made narrower at the side of the supply flow 4 than at the side of the discharge flow, as shown in FIG. 11, but it is also possible to use plates with a uniform width. In the former case the collecting duct 16 is wider at the supply side than at the discharge side. At the supply side each collecting duct 16 is closed by a wedge-shaped guiding partition 17 forcing the supply flow towards the passages 6 between the plates 2, and preventing the flow 4 from directly penetrating the ducts 16.

Furthermore, for preventing turbulences in the collecting ducts 16 and promoting a more uniform discharge of the separated components, guiding partitions 13' are arranged in the collecting ducts 16, which partitions may be directed vertically as shown at the left hand side of FIG. 11, but it is also possible to arrange these partitions at a slope promoting the removal of the separated components along their surface. The guiding partitions 13' at the right hand side of FIG. 11 are wedge-shaped, and are positioned at a slope as clearly appears from FIG. 12.

Preferably the plates 2 are provided with profiles 3, e.g. in the form of protruding ridges or corrugations. These profiles preferably extend obliquely in respect of the liquid flow, and in such a manner that these ridges at an edge joining a collecting duct 16 have a greater distance from the supply side. In the embodiment according to FIGS. 11 and 12 the profiles are symmetrical in respect of the crest 5'.

The guiding partitions 13' in the ducts 16 join, at both sides, the tops of the profiles of the adjacent plates 2. In the case shown a partition 13' is present between each pair of profile tops, but it is also possible to use a smaller number of partitions 13'. These partitions may, in particular, be used at the same time as distance pieces between the plates 2.

In the embodiment according to FIG. 9 it is to be prevented that the flow in the passages 6 at the side remote from the discharge side of the separated components towards the collecting duct 16 in question arrives in the adjacent duct 16. To that end longitudinal partitions 13'' may be provided which are, in a device for separating precipitating components, situated near the higher sides of the plates 2, as shown at the left hand side of FIG. 9, and, in a device for separating floating component, are provided near the lower sides of these plates, as shown at the right hand side of FIG. 9. When precipitating as well as floating components are to be separated, these partitions may be arranged substantially in the middle of the ducts 16, as shown in the middle part of FIG. 9. Also in the embodiment of FIG. 10 such longitudinal partitions may be used, which are, then, arranged in the middle of the ducts 16, in order to prevent turbulences in the flow of separated components entering at both sides of the duct 16.

Figure 12:
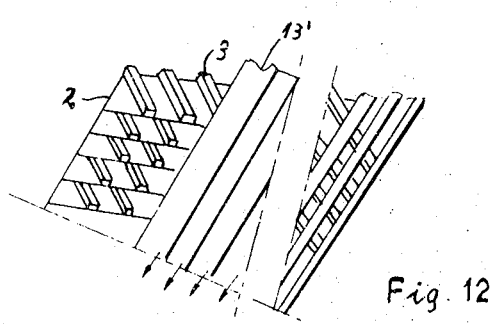
FIG. 12 a cross-section along the line XII — XII of FIG. 11 with parts broken away.

From FIGS. 11 and 12 it clearly appears that, when using wedge or trough shaped guiding partitions 13', the profiles 3 of the plates 2 are directed in such a manner that a smooth transition of the separated components towards the surface of the partitions 13' is obtained. The corresponding profiles 3 of superposed plates are, therefore, mutually staggered in such a manner that they all join the edge of the same partition 13'. The operation of such a plate assembly is as follows. The liquid flow 4 to be treated flows through the passages 6, and the precipitating components precipitate on these plates and slide downwards along these plates, and this in the lower parts or valleys of the profiles 3. The sediment then arrives in the collecting duct 16 between the partitions 13' present therein. The components which precipitate easier are separated first, and those which precipitate more difficulty are separated last. As a consequence of the gradually increasing width of the plates 2, a gradually increasing precipitation surface is provided, facilitating the sedimentation of the components which precipitate more difficulty. In this manner the sediment with different particle sizes may be collected in separated sections between the partitions 13', so that a fine classification is possible.

It is remarked that the profiles 3 are not absolutely necessary, and that in some cases smooth plates may provide a similar effect.

Instead of the V-shaped guiding troughs 13' shown in FIGS. 11 and 12 also curved troughs may be used. In that case the profiles 3 of the plates 2 substantially extend along the intersecting lines of the tangent planes to the edges of these troughs and the main plane of the plate 2 in question, in order to obtain a smooth junction of the profile valleys to the surfaces of these troughs.

Figure 13:
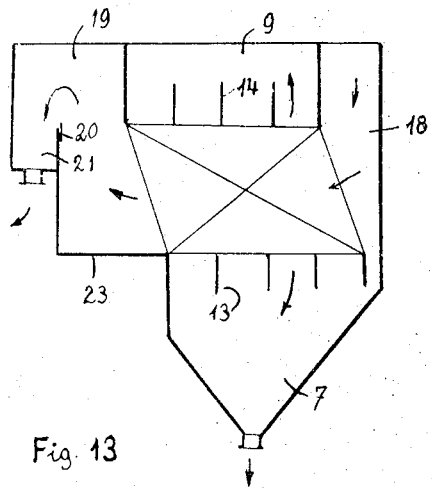
FIG. 13 a simplified cross-section of a device according to the invention with such a separation assembly.

FIG. 13 shows a simplified cross-section of a complete separation device according to the invention, in which only the outer boundaries of the plate assembly 2 are indicated. A preferred embodiment of this assembly is shown, in which the bordering surfaces at the supply and discharge sides extend parallel to the oblique guiding partitions. In the case of vertical partitions these bordering surfaces are, of course, substantially vertical.

The plate assembly 1 is situated in a tank 23 comprising a supply duct 18 and a discharge duct 19, the latter communicating by means of an overflow weir 20 with a discharge trough 21. The lower side of this assembly 1 communicates with a discharge funnel 7 for the sediment, at the upper side of this funnel guiding partitions 13 being arranged as described in the preceding description in order to prevent short-circuit flows. These partitions 13 join the corresponding partitions 13' in the collecting ducts 16 between the plates 2.

In the case of flotating components and an adapted construction of the assembly 1, these components arrive in a flotation chamber 9 in which again guiding partitions 14 are present joining the guiding partitions 13' of the collecting ducts.

Figure 14:
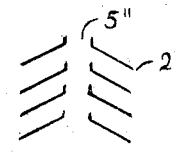
FIGS. 14 and 15 highly simplified views of parts of a modified embodiment of such an assembly.

Since the sediment may often drag along water that is separated only in the lower part of the ducts 16 or in the funnel 7, a back flow path for this water should be provided. This may be done, as shown in FIG. 14, by providing openings 5'' at the crest 5' between the plates 2 of a pair, which openings may be continuous or interrupted. The superposed openings 5'' form then a back flow duct for the water. It may be preferable to bend the adjacent edges of the plates upwards as shown.

Figure 15:
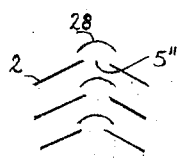

In a device for separating precipitating as well as flotating components, the plate pairs 2 may be completely separated from one another, and the openings 5'' may then be shaped in the same manner as the ducts 16, the complete device then comprising, in the manner of FIG. 13, a sediment funnel 7 as well as a flotation chamber 9. It is also possible to arrange, as shown in FIG. 15, discharge troughs 28 above the openings 5'', which have, in particular, a conically widening shape for facilitating the discharge.

In the embodiment of FIG. 9, the back flow path for the water, as mentioned before, may be obtained by positioning the longitudinal partitions 13'' not against the plates 2 but at a small distance therefrom. As mentioned before, such an assembly may also be designed for mixed separation by arranging the latter partitions 13'' about in the middle of the ducts 16.

Figure 16:
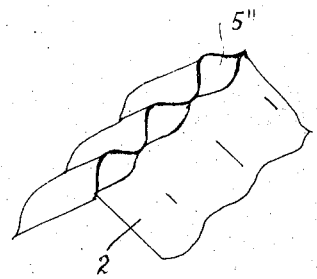
FIG. 16 an isometric view of another embodiment of the separation bordering means for assemblies according to FIG. 14 or FIG. 15.

FIG. 16 shows a special embodiment of the plate assembly diagrammatically shown in FIG. 14, in which corrugated plates 2 are used joining each other in the valleys of the corrugations, openings 5'' remaining free between the tops of these corrugations. In an assembly for separating flotating components these plates have an opposite slope and join each other in the tops of the corrugations, the openings then remaining free between the valleys.

Figure 17:
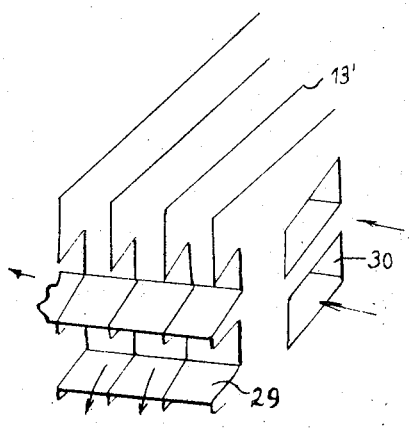
FIG. 17 a diagrammatical isometric view with parts broken away of still another embodiment of the separation assembly according to the invention.

FIG. 17 shows a diagrammatical representation of a special embodiment of the invention. In this case the guiding partitions 13' which are shown as vertically extending but which may also be positioned at a slope, extend over the full width of the assembly. In these plates lips 29 are punched out so that openings 30 are provided. The length of these lips corresponds with the distance between the partitions 13', and the openings 30 of successive plates are aligned, so that the free edges of the punched-out lips join the side of the subsequent lip 29 which is still connected with the partition 13' in question. The aligned lips 29 thus form a continuous surface corresponding with the plates 2 of the preceding embodiments. It is also possible to obtain the structure of FIGS. 2 or 6 by making openings 30 in the plates 13' with opposite shape which join each other or are positioned at some mutual distance.

Furthermore it is possible to have the distance between adjacent plates 2 in the sense of flow gradually varying and/or to vary the distance between successive profiles in that sense, when this will promote the separation of the various components. Furthermore it is possible, as described above to divide the assembly in the sense of flow into two parts and to use one part, e.g. the first one, for sedimentation, and the other one for flotation, means being provided between both parts for supplying a flotation promoting agent.

Within the scope of the invention many modifications are possible.

I claim:

1. A device for separating components from a carrier liquid, which components have a specific mass differing from that of the carrier liquid, comprising a tank including a supply chamber for the liquid to be treated, a discharge chamber for the treated liquid, and at least one collecting duct for components separated from the carrier liquid;

at least one plate assembly located in said tank between said supply chamber and said discharge chamber and including a plurality of spaced, substantially parallel plate means defining a plurality of separation passages which extend from one end of said plate means communicating with said supply chamber to the opposite end of said plate means communicating with said discharge chamber and through which the liquid being treated is guided from said supply chamber towards said discharge chamber;

said plate means having at least one side communicating with said collection duct and including means defining a plurality of substantially parallel, trough-like collection passages which extend transversely of the flow direction of the liquid being treated and toward said collection duct and which are adapted to collect the components separated in respective of said separation passages and guide the thus-collected components toward said collection duct substantially out of contact with the liquid flow through said separation passages; and said plate means being inclined from the horizontal less than 90° so as to promote the movement of the collected components through said collection passages towards said collection duct.

2. A device according to claim 1 including a plurality of spaced baffles located in said collecting duct adjacent to a side of said plate means and extending transversely of the flow direction of the liquid being treated and substantially parallel to the longitudinal axes of said collection passages for minimizing the passage of the liquid being treated from said separation passages directly into said collection duct.

3. A device according to claim 1 including a baffle partially covering the portion of one end of said plate means and thereby closing the ends of said separation passages adjacent to said collection duct.

4. A device according to claim 1
wherein the liquid being treated includes first and second components one having a specific mass higher than that of the carrier liquid and the other having a specific mass lower than the carrier liquid, and wherein said plate means includes first and second sections located in series with respect to the direction of the liquid flow through said separation passages, the collection passage defining means of said first section adapted to primarily guide the first components separated from the liquid being treated towards a first collection duct located in communication with one side of said plate means and the collection passage defining means of said second section adapted to primarily guide second component separated from the liquid towards a second collection duct located in communication with the opposite side of said plate means.

5. A device according to claim 4 including a means for introducing an agent, which promotes separation of the second component from the carrier liquid, into the liquid being treated at a location between said first and second sections.

6. A device according to claim 1 wherein said tank includes an outer wall having a circular cross section and said plate assembly being arranged in a fan-like array with the plate means in rotational symmetry along said wall and being directed transversely to said wall.

7. A device according to claim 1 including a plurality of said plate assemblies arranged in juxtaposed relationship within said tank, said plate assemblies being mutually separated by a collecting duct, said plate means being superposed, and said collecting ducts being separated from said supply chamber by baffles which guide the liquid being treated towards the inlet of said separation passages of said plate assemblies.

8. The device according to claim 7 wherein the distance between the sides of said plate means gradually increase in the flow direction of the liquid through said separation passages.

9. The device according to claim 7 including longitudinal partitions located in each of said collecting ducts adjacent to one side of said plate means and extending substantially parallel to the flow direction of the liquid through said separation passages.

10. The device according to claim 7
wherein the adjacent plate assemblies are arranged with the incline of said plate means of one being symmetrically opposed to the incline of said plate means of the other; and
wherein the arrangement of the collection passage defining means of the plate means of each of said plate assemblies are arranged in a mirror symmetry with the corresponding collection passage means of the adjacent plate assembly.

11. A device according to claim 10 including
a collection vessel communicating with one end of said collection duct; and
substantially parallel, spaced guiding partitions located in each of said collection ducts for guiding separated components collected in said collection ducts towards said collecting vessel, said guiding partitions extending between the adjacent sides of the plate means of adjacent assemblies in alignment with corresponding collecting passage defining means.

12. A device according to claim 11 wherein the distance between the sides of said plate means gradually increases in the flow direction of the liquid through said separation passages.

13. A device according to claim 12 wherein said guiding partitions have a trough-like cross section.

14. A device according to claim 7 wherein said plate means of said plate assembly includes two sections which are inclined towards each other in the form of an inverted V with respect to the flow direction of the liquid flowing through said separation passages.

15. A device according to claim 14 wherein the adjacent lateral sides of said plate means section are spaced apart to define openings therebetween.

16. A device according to claim 15 including trough-shaped collecting duct means located between superposed plate means and saddling said openings between said plate means sections.

* * * * *

REEXAMINATION CERTIFICATE (256th)
United States Patent [19]
Pielkenrood

[11] B1 3,837,501
[45] Certificate Issued  Oct. 2, 1984

[54] SEPARATION DEVICE

[75] Inventor: Jacob Pielkenrood, Krommenie, Netherlands

[73] Assignee: Pielkenrood-Vinitex N.V., Krommenie, Netherlands

Reexamination Requests:
No. 90/000,283, Nov. 4, 1982
No. 90/000,327, Feb. 14, 1983

Reexamination Certificate for:
Patent No.: 3,837,501
Issued: Sep. 24, 1974
Appl. No.: 112,620
Filed: Feb. 4, 1971

[30] Foreign Application Priority Data

Feb. 6, 1970 [NL] Netherlands .................. 7001713
Mar. 27, 1970 [NL] Netherlands .................. 7004494

[51] Int. Cl.³ .......................................... B01D 21/10
[52] U.S. Cl. .................................................. 210/522
[58] Field of Search ........................ 210/519, 521, 522

[56] References Cited
U.S. PATENT DOCUMENTS

| | | |
|---|---|---|
| 386,114 | 7/1888 | Donahue . |
| 758,484 | 4/1904 | Stewart . |
| 801,679 | 10/1905 | Niclausse . |
| 1,030,271 | 6/1912 | Arbuckle . |
| 1,190,863 | 7/1916 | Corne . |
| 1,654,839 | 1/1928 | Scoville . |
| 1,709,676 | 4/1929 | Martyn . |
| 1,732,386 | 10/1929 | Sprockhoff . |
| 1,946,414 | 2/1934 | Schmid . |
| 2,014,431 | 9/1935 | Foster . |
| 2,207,399 | 7/1940 | Gaertner . |
| 2,261,101 | 10/1941 | Erwin . |
| 2,595,838 | 5/1952 | Fuglie . |
| 2,673,451 | 3/1954 | Gariel . |
| 2,868,384 | 1/1959 | Puddington . |
| 3,346,122 | 10/1967 | Cornelissen . |
| 3,666,112 | 5/1972 | Peilkenrood . |

*Primary Examiner*—Charles N. Hart

[57] ABSTRACT

A device for separating components from a carrier liquid, comprising mutually parallel corrugated plates, troughs or similarly shaped surfaces, delimiting therebetween separation passages, the longitudinal axes of which corrugations or the like which determine the direction of removal of the separated components include an angle with the direction of the supply and discharge flow of the liquid, in order to obtain an optimal separation between the liquid flow and the flow of the separated components to be removed from the device.

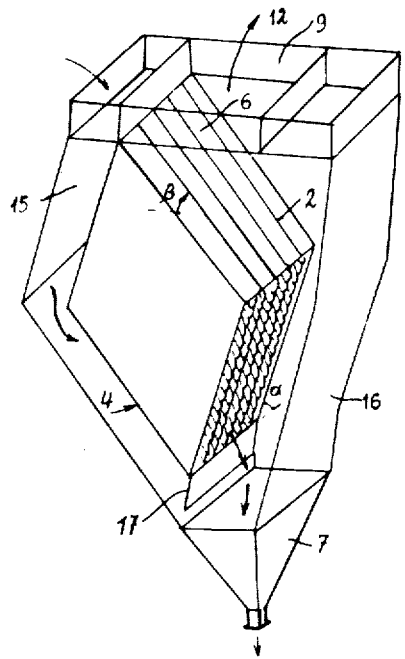

REEXAMINATION CERTIFICATE ISSUED UNDER 35 U.S.C. 307.

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7–16 is confirmed.

Claims 1–6 are cancelled.

New claims 17–20 are added and determined to be patentable.

*17. A device for separating components from a carrier liquid, which components have a specific mass differing from that of the carrier liquid, comprising:*
- *a tank including a supply chamber for the liquid to be treated, a discharge chamber for the treated liquid, and at least one collecting duct for components separated from the carrier liquid;*
- *at least one plate assembly located in the tank, said plate assembly including a plurality of spaced, superposed and substantially parallel corrugated plates defining a plurality of separation passages extending from one end of the plate assembly to the opposite end thereof, one end of the plate assembly contiguous with and communicating with the supply chamber, the opposite end of the plate assembly contiguous with and communicating with the discharge chamber, for flowing the liquid being treated from the supply chamber, through the separation passages and into the discharge chamber;*
- *a substantially constant cross section flow path for the carrier liquid, said flow path defined by the separation passages and the contiguous supply and discharge chambers in which the flow path encompasses substantially all the separation passages;*
- *the axes of the corrugated plates defining collecting passages that are substantially transverse to the flow of the liquid being treated, said collecting passages providing a path for guiding the components substantially out of contact with the carrier liquid as they rise or settle by their own differing specific masses;*
- *said collecting passages terminating at opposite sides, at least one side of which extends to and openly communicates along its entire side with at least one collecting chamber adapted to receive the transversely guided components;*
- *said plates being inclined from the horizontal less than 90° to promote the movement of the collected components along the collecting passages to the collecting duct.*

*18. A device according to claim 17 including a plurality of spaced partitions located in said collecting duct adjacent to and projecting from a side of said plates and extending transversely of the flow direction of the liquid being treated and substantially parallel to the longitudinal axes of said collection passages for minimizing the passage of the liquid being treated from the separation passages directly into the collection duct.*

*19. A device according to claim 17 including a masking plate partially covering the portion of one end of said plate assembly and thereby closing the ends of said separation passages adjacent to said collection duct.*

*20. A device according to claim 17*
- *wherein the liquid being treated includes first and second components, one having a specific mass higher than that of the carrier liquid and the other having a specific mass lower than the carrier liquid, and*
- *wherein said plate assembly includes first and second sections located in series with respect to the direction of the liquid flow through said separation passages, the collection passage defining means of said first section adapted to primarily guide the first components separated from the liquid being treated towards a first collection duct located in communication with one side of said plate assembly and the collection passage defining means of said second section adapted to primarily guide second component separated from the liquid towards a second collection duct located in communication with the opposite side of said plate assembly.*

* * * * *